United States Patent
Walley et al.

(10) Patent No.: US 9,825,472 B2
(45) Date of Patent: Nov. 21, 2017

(54) PRU SHORT BEACON DETECTION

(71) Applicant: BROADCOM CORPORATION, Irvine, CA (US)

(72) Inventors: John S. Walley, Ladera Ranch, CA (US); Angel Arturo Polo, Solana Beach, CA (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 267 days.

(21) Appl. No.: 14/714,139

(22) Filed: May 15, 2015

(65) Prior Publication Data

US 2015/0340876 A1    Nov. 26, 2015

Related U.S. Application Data

(60) Provisional application No. 62/153,462, filed on Apr. 27, 2015, provisional application No. 62/002,690, filed on May 23, 2014.

(51) Int. Cl.

| | |
|---|---|
| *H01F 27/42* | (2006.01) |
| *H02J 5/00* | (2016.01) |
| *H04W 4/00* | (2009.01) |
| *H02J 7/02* | (2016.01) |
| *H04B 5/00* | (2006.01) |
| *H02J 17/00* | (2006.01) |

(52) U.S. Cl.
CPC .............. *H02J 5/005* (2013.01); *H02J 7/025* (2013.01); *H04B 5/0037* (2013.01); *H04W 4/008* (2013.01); *H02J 17/00* (2013.01)

(58) Field of Classification Search
CPC ............ H02J 5/005; H02J 17/00; H02J 7/025; H04W 4/008; H04B 5/0037
USPC ......................................... 307/104
See application file for complete search history.

(56) References Cited

U.S. PATENT DOCUMENTS

| | | | |
|---|---|---|---|
| 2012/0223589 A1* | 9/2012 | Low ................. | H04B 5/0037 307/104 |
| 2014/0094116 A1 | 4/2014 | Walley et al. | |
| 2014/0333145 A1* | 11/2014 | Lee ..................... | H02J 17/00 307/104 |
| 2015/0115878 A1* | 4/2015 | Park .................... | H02J 7/025 320/108 |
| 2015/0333797 A1* | 11/2015 | Nejatali ............. | H04B 5/0043 375/376 |

FOREIGN PATENT DOCUMENTS

| | | |
|---|---|---|
| CN | 102904348 A | 1/2013 |
| WO | WO-2013/012111 A1 | 1/2013 |

* cited by examiner

*Primary Examiner* — Jared Fureman
*Assistant Examiner* — Duc M Pham
(74) *Attorney, Agent, or Firm* — McDermott Will & Emery LLP

(57) ABSTRACT

A device for detecting a short beacon signal includes a power-receiving unit (PRU) to receive the short beacon signal from one or more power-transmitting units (PTUs). An active load level is asserted for detection by the one or more PTUs in response to the short beacon signal. The active load level, once asserted, makes a detectable change in a reflected impedance associated with the PRU as measured by at least one of the one or more PTUs.

20 Claims, 11 Drawing Sheets

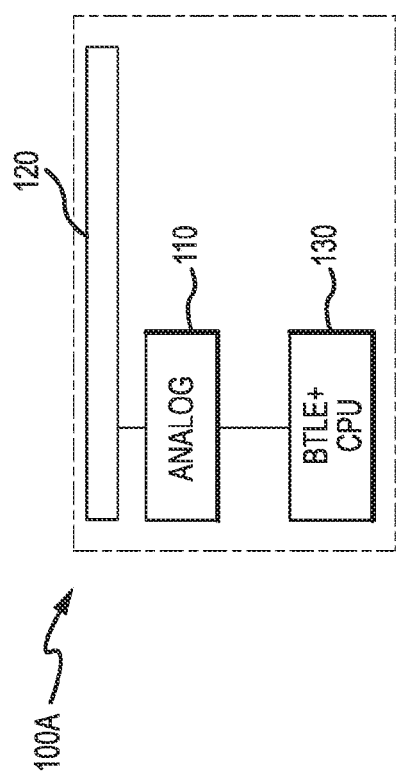
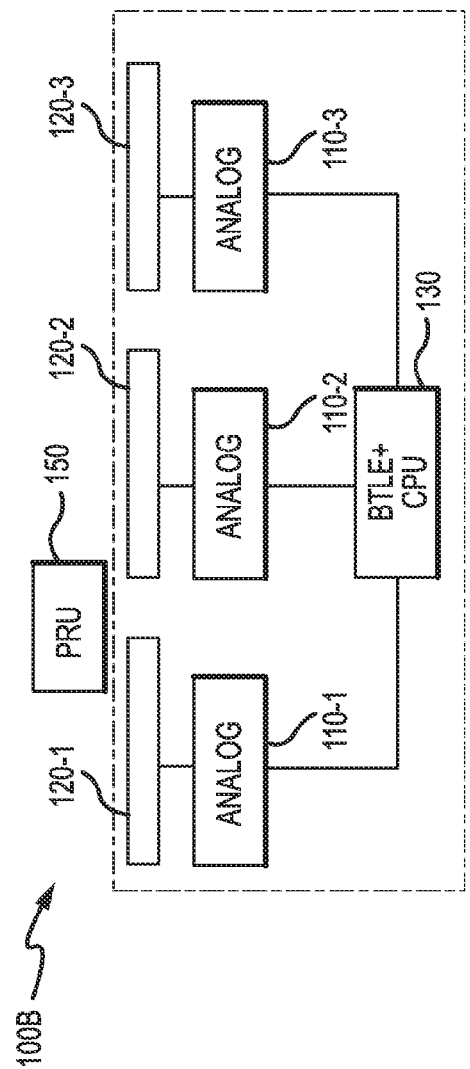

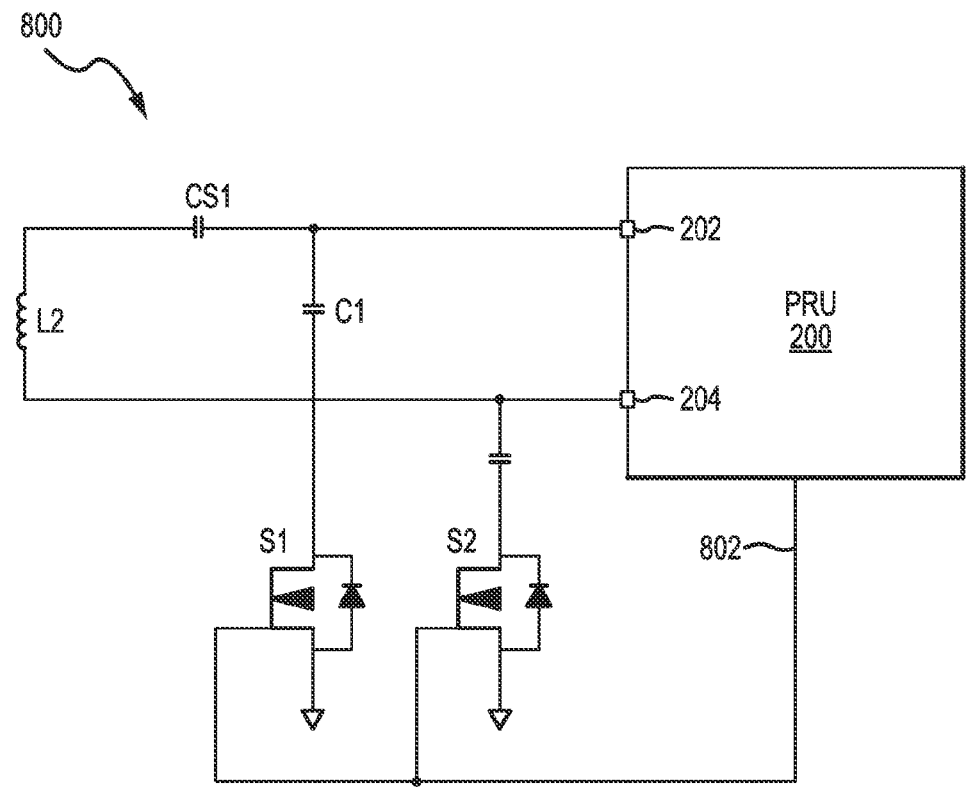
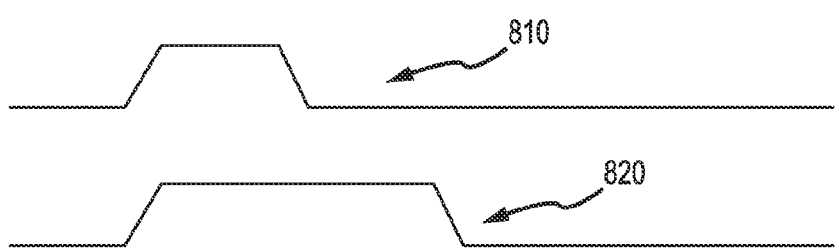
FIG.8

PRU SHORT BEACON DETECTION

CROSS-REFERENCE TO RELATED APPLICATIONS

This application claims the benefit of priority under 35 U.S.C. §119 from U.S. Provisional Patent Application 62/002,690, filed May 23, 2014, and 62/153,462, filed Apr. 27, 2015, which are incorporated herein by reference in their entirety.

TECHNICAL FIELD

The subject technology generally relates to charging circuits and, in particular, relates to the detection of a Power Receiving Unit (PRU) by a Power Transmitting Unit (PTU) during a short beacon period.

BACKGROUND

Wireless electrical energy transmission from a Power Transmitting Unit (PTU) to a Power Receiving Unit (PRU) can be achieved without man-made conductors. This mode of power transmission may be useful in a number of circumstances, for example, when the interconnection wires are inconvenient, hazardous, or impossible. Cross connection occurs when the radio-frequency (RF) control channels such as Bluetooth Low Energy (BTLE) forms a connection between wrong PTU-PRU pairs. Currently, there exists a mechanism for detection of PRU impedance change by triggering a 105 ms discovery window for an initial advertisement form the PRU. Another mechanism uses BTLE received signal strength indication (RSSI) filtering to try and correlate the advertisement transmitter with proximity to a charging surface.

Detection of a PRU during the short beacon by methods of impedance detection is quite difficult or impossible in some cases and remains an unresolved issue. Some solutions remove the requirement that a PTU has to detect a PRU using short beacons. Other solutions require and test that PTUs can detect a minimum reflected impedance change from an open pad, which are not clear regarding how to create the reflected impedance. There are also proposals for requiring and testing that PTU has the capability to detect a special PRU reflected impedance. The PTU periodically (e.g., every ¼ second) transmit a short (e.g., 10 msec long) beacon to detect a presence of a PRU, and once the presence of the PRU is reliably detected, the PTU can further energize its coil and transmit a stronger and longer charging pulse (e.g., a long beacon). The PTU saves a substantial amount of energy by not having to transmit long beacons very often.

BRIEF DESCRIPTION OF THE DRAWINGS

Certain features of the subject technology are set forth in the appended claims. However, for purpose of explanation, several embodiments of the subject technology are set forth in the following figures.

FIGS. 1A-1B are high level diagrams illustrating example systems for wireless transmission of electrical power, in accordance with one or more implementations.

FIG. 8 illustrates another example of a device for detection of a PRU during a short beacon using a switched hybrid matching circuit employing external switches, in accordance with one or more implementations.

DETAILED DESCRIPTION

Figure 2A:
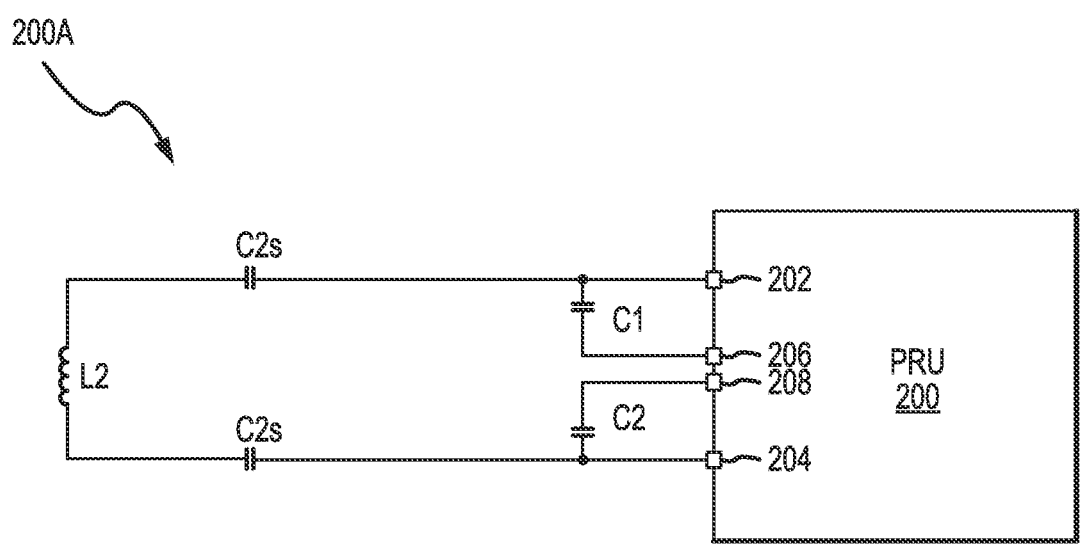
FIGS. 2A through 2C illustrate an example of a device for detection of a power receiving unit (PRU) short beacon using load capacitors and a corresponding time diagram, in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In one or more aspects of the subject technology, methods and implementations for assisting a power receiving unit (PRU) with short beacon signal detection are described. The subject technology enables assertion of an active load level (e.g., an active load pulse) by the PRU that allows a power transmitting unit (PTU) to detect a change in a reflected impedance of the PRU during a short beacon as a signature of the presence of the PRU and availability for receiving electrical energy from the PTU. The detection of the presence of the PRU during the short beacon allows the PTU to significantly save energy by not energizing its coils without having a reliable knowledge of the presence of the PRU to receive the transmitted energy.

FIGS. 1A-1B are high level diagrams illustrating example systems 100A and 100B for wireless transmission of electrical power, in accordance with one or more implementations of the subject technology. The system 100A depicted in FIG. 1A shows a single-coil PTU and includes a magnetic coil 120 that is energized by a circuitry (e.g., an analog block) 110. The system 100A further includes a Bluetooth low energy (BTLE) circuitry and CPU which are in combination represented by a BTLE+CPU block 130. The BTLE circuitry includes known RF and baseband radios for transmitting and receiving RF signals including BTLE signal. The CPU controls operation of the analog block 110, for example, based on signals received by the BLTE circuitry. The signals received by the BLTE circuitry include, for example, signals from a PRU 150.

The system 100B shown in FIG. 1B depicts a multi-coils PTU and includes a number of magnetic coils such as 120-1, 120-2, and 120-3 that are coupled to and are energized by a corresponding number of analog blocks such as 110-1, 110-2, and 110-3 and share a common BTLE+CPU block 130. In some implementations, the magnetic coils can form a magnetic coil array, for example, formed of a number of tile configuration. Each tile configuration can include a two dimensional configuration of coils (e.g., 2×2 or 3×3, or the like). The PTU of system 100B has to detect which coil(s) of the magnetic coil array is (are) in close proximity of a PRU and only energized that (those) coil(s) in order to be able to save in energy consumption. The detection of the presence of PRU by using short beacons is discussed in more detail herein.

The subject technology enables the PTU to detect presence of the PRU by detection of a change in a reflected impedance (RI) associated with the PRU. In a normal magnetic interaction, reflected impedance changes can be induced at the PTU, for example, by increasing metal on the PRU or increasing ferrite. The subject technology induces the impedance change by asserting an impedance load such as a hybrid matching impedance. The PTU coil impedance for a single PRU with hybrid matching is given as:

$$R1 + j \cdot \omega \cdot L1 + \frac{\omega^2 \cdot (k12 \cdot \sqrt{L1 \cdot L2})^2}{\left[R2 + j \cdot \omega \cdot L2 + \frac{\left(ZL + \frac{1}{j \cdot \omega \cdot Cs2}\right) \cdot \frac{1}{j \cdot \omega \cdot Cp2}}{ZL + \frac{1}{j \cdot \omega \cdot Cs2} + \frac{1}{j \cdot \omega \cdot Cp2}}\right]} +$$

$$(Re\_PTU + j \cdot Xe\_PTU) + (Re\_PRU + j \cdot Xe\_PRU)$$

Where: R1=PTU coil resistance, L1=PTU coil self-inductance, L2=PRU self-inductance, Cs2 and Cp2=PRU matching capacitances, ZL=PRU load (complex variable), R2=PRU coil resistance, Re_PTU=real resistance from eddy current losses created by eddy currents around the PTU housing and shielding and ferrite (positive and very small typically), Re_PRU=real resistance from eddy current losses created by eddy currents in the PRU (positive and small, in the 20-200 milli-Ohm range), Xe_PTU=reactance from eddy current losses created by eddy currents around the PTU housing and shielding and ferrite. This reactance is typically small, e.g. <<1 Ohm. The polarity of this reactance depends on the PTU material conducting the eddy currents. If there is little metal and mostly ferrite, then the reactance is inductive. If there is a lot of metal and little ferrite then the reactance is capacitive. Xe_PRU=reactance from eddy current losses created by eddy currents in the PRU. This reactance, Xe_PRU, can be large (e.g. several Ohms). The polarity of this reactance depends on the PRU material. If there is little metal and mostly ferrite, then this reactance is inductive. If there is a lot of metal and little ferrite then this reactance is capacitive. K12=coupling coefficient. The term with k12 is the reflected impedance from the conductive load at the PRU. If ZL is a capacitive load then the coupling coefficient is inductive. If ZL is a resistor then the coupling coefficient has a small reactance if properly tuned.

The parameters Re_PRU and Xe_PRU can be detected by highly sensitive detection circuits used at the PTU, while correlations are performed over many samples. In this process, if there is any real loss, it is always a resistive loss. There is a small probability that reactive terms (e.g., Xe_PRU and Xe-PRU) could cancel out. The cancellation of the reactive terms, although may not occur very often, but affects the reliability of detection of the PRU reflected impedance change. The subject technology enables the PRU to provide a more reliable reflected impedance change by asserting an active load level and in some implementations combing that with transmission of RF signals (e.g., BTLE signals) as will be discussed herein.

Figure 2B:
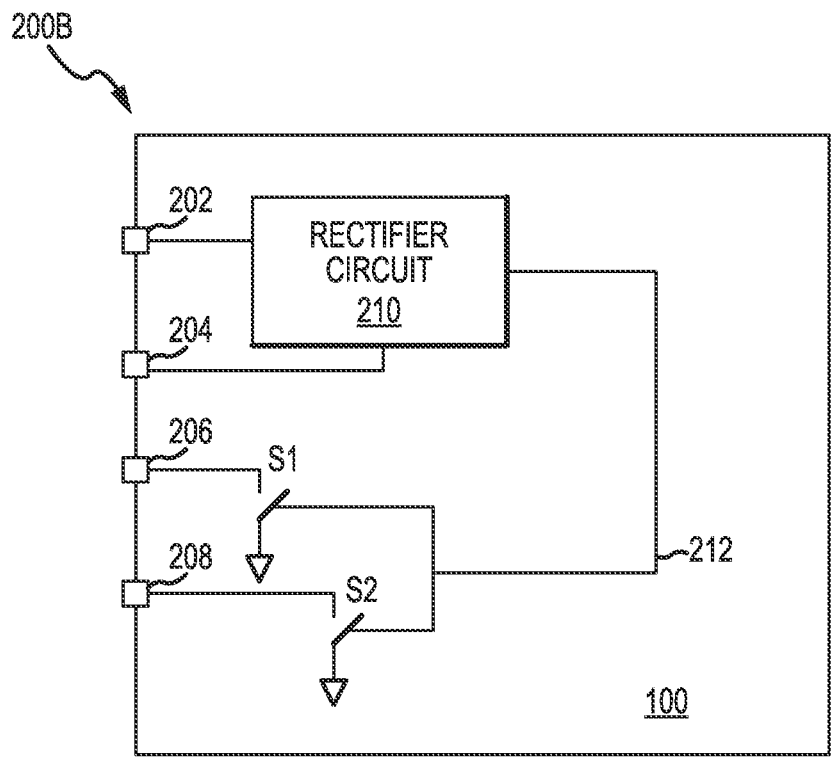
Figure 2C:
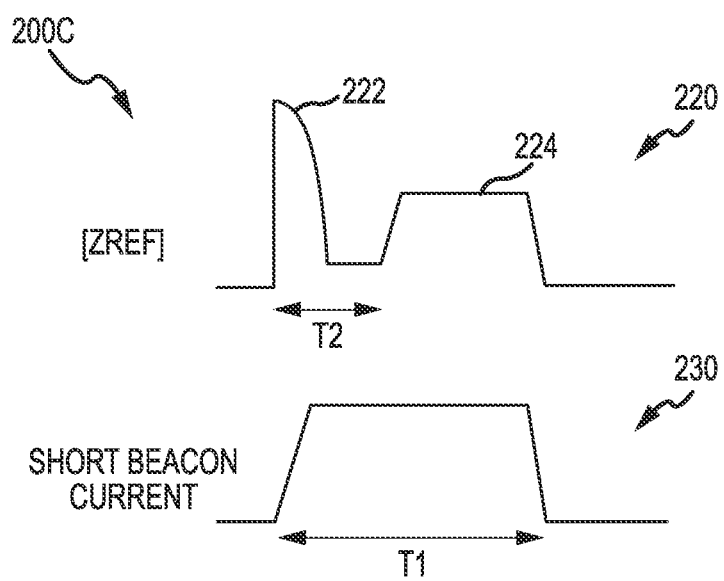

FIGS. 2A through 2C illustrate an example of a device 200A for detection of a power receiving unit (PRU) during a short beacon using load capacitors and a corresponding time diagram 200C, in accordance with one or more implementations of the subject technology. The device 200A includes a PRU 200 (e.g., a PRU chip) which is coupled at input nodes 202 and 204 to a PRU inductance L2 (e.g., PRU magnetic coil) and matching capacitances C2s in series with the inductance L2. Additionally, the PRU 200 can assert an active load level such as formed by capacitors C1 and C2 (e.g., first passive reactive elements), which are coupled between input nodes 202 and 204 and nodes 206 and 208 of the PRU 200. The PRU 200, as shown in FIG. 2B, includes, among other circuitry, a rectifier circuit 210 and switches S1 and S2. The rectifier circuit 210 rectifies and filters the input pulses received at input nodes 202 and 204 from a PTU (e.g., 100A of FIG. 1A) and provide energy to a charger circuit (not shown for simplicity) of an apparatus (e.g., a handheld communication device such as a cell phone, a tablet, a phablet and the like) that includes the device 200A.

The input pulses, in order to be able to turn ON the rectifier circuit 210, need to provide a voltage amplitude equal to of at least two diode drops. Further, the rectifier circuit 210 has to be able to activate switches S1 and S2 in order to assert the impedance load (e.g., capacitances C1 and C2). In some implementations, the switches S1 and S2 are realized by using field-effect transistors (FETs) and the rectifier circuit 210 has to provide sufficient voltage (e.g., 2.8V) to turn the FETs ON. The switches, once turned ON, connect the nodes 206 and 208 to the ground potential. It is understood that capacitances C1 and C2 are not part of the reflected impedance of the PRU when the switches S1 and S2 are OFF, and are only allow a surge current to pass through them when they are connected to the ground potential by the activated switches (e.g., FETs) S1 and S2.

FIG. 2C shows a time diagram 200C including a plot 220 of the reflected impedance ($R_{ref}$) amplitude versus time and a plot 230 of a short beacon current. The first pulse 222 is due to a surge current passing through capacitors of the rectifier circuit 210. The surge current is induced by a short beacon current pulse 230 transmitted by the PTU that is strong enough to not only turn ON the rectifier circuit 210, but also to enable the activation of the switches S1 and S2 by the rectifier circuit 210. The first pulse 222 is followed by a second pulse 224 within a time interval T2 (e.g., 5 msec) from the start of the short beacon current pulse 230, which has a duration of T1 (e.g., ~10) msec. The switches S1 and S2 can be turned OFF by the termination of the short beacon or by the PRU through, for example, software control. The reflected impedance change sensed by the PTU due to the asserted load, as represented by the second pulse 224, can be readily and reliably detected by the PTU, even when the above mentioned cancellation of reactive impedances occur.

Figure 3A:
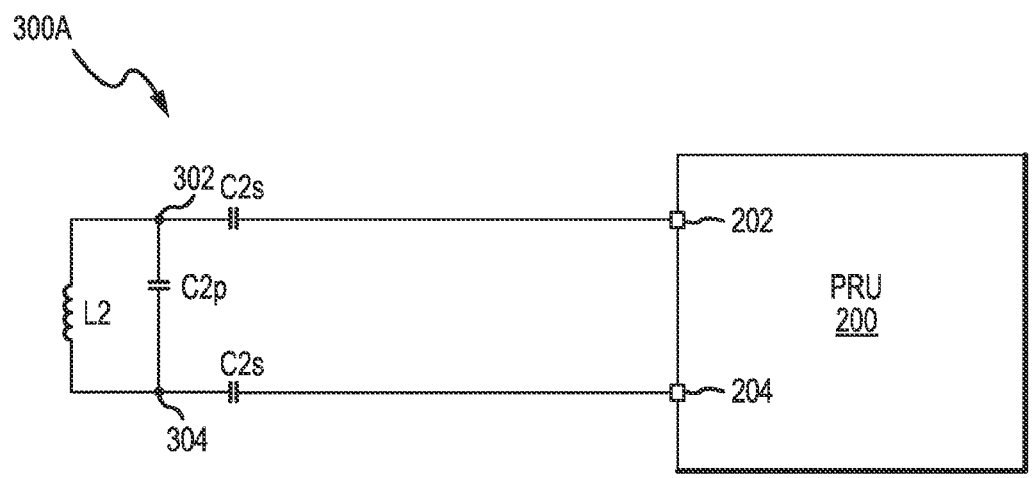
FIGS. 3A-3B illustrate examples of devices for detection of a PRU short beacon using a hybrid matching circuit, in accordance with one or more implementations.
Figure 3B:
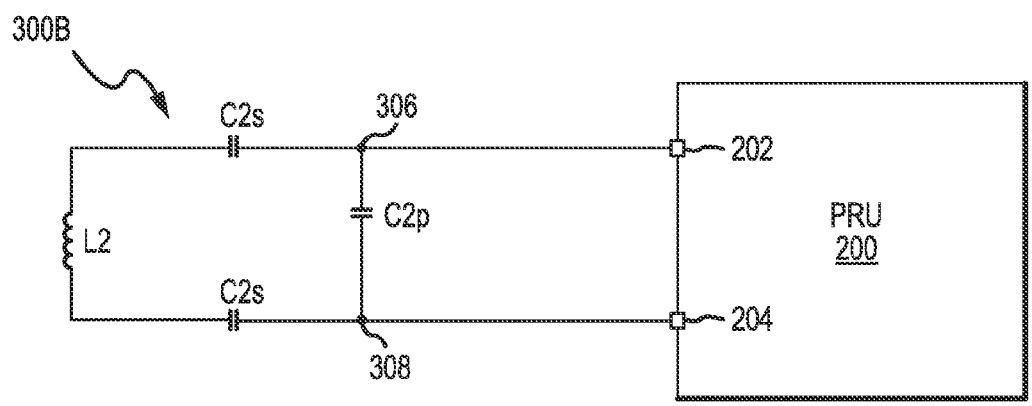

FIGS. 3A-3B illustrate examples of devices 300A and 300B for detection of a PRU during a short beacon using a hybrid matching circuit, in accordance with one or more implementations of the subject technology. In some implementations, it is possible to use a hybrid match to induce a load (e.g., C2p of FIG. 3A) even when the short beacon transmitted by the PTU is not able to turn ON the PRU 200. The parallel capacitance C2p is added to the reflected impedance of the PRU, regardless of the strength of the short beacon. This solution works well and is low cost but can potentially create some issue if C2p is made too large. For example, the received (RX) voltage at nodes 202 and 204 of the PRU 200 can become too high, which requires PRU coil turns to be reduced (e.g., smaller L2) that can cause loss in efficiency if C2p becomes too high. Further, the term Zrx_in the reflected impedance increases as C2p is increased, which can make Zrx_in undesirable for load regulation.

FIG. 3B shows the device 300B, where the induced load (e.g., C2p) is inserted before the matching capacitances C2s. The device 300B has similarly advantages as it works independent of the strength of the short beacon received from the PTU. The capacitance C2p in FIG. 3B cannot be made too large for reasons similar to those explained with respect to FIG. 3A.

Figure 4:
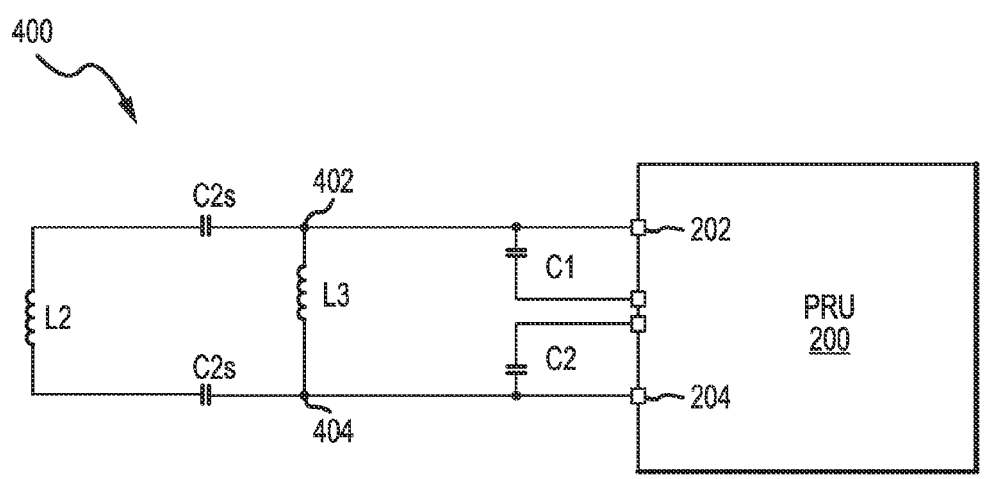
FIG. 4 illustrates another example of a device for detection of a PRU short beacon using a switched hybrid matching circuit, in accordance with one or more implementations.

FIG. 4 illustrates an example of a device 400 for detection of a PRU short beacon using a switched hybrid matching circuit, in accordance with one or more implementations of the subject technology. In the device 400 shown in FIG. 4 is similar to device the 200A of FIG. 2A, except for addition of a fixed reactive load L3 (e.g., a second passive reactance element) to the PRU. The induced effect of the fixed reactive load L3 in the reflected impedance of the PRU exists from the beginning of the short beacon current pulse 230 of FIG. 2C. In other words, the induced load level effect of the reactive load L3 on the reflective impedance of the PRU is applied instantaneously, which allows the PTU to use short beacons with very short time duration (e.g., 1 msec). The short beacon of very short time duration (e.g., 1 msec) do not need to be able to turn on the rectifier circuit (e.g., 210 of FIG. 2B) for this solution. The effect of the reactive load L3 has to be taken out at a later time, when the device 400 is detected by the PTU. This role is performed by capacitances C1 and C2 (e.g., the first passive reactance elements), which are asserted at a proper time by, for example, a software-controlled signal (e.g., delayed signal) and cancel the effect of the reactive load L3. The device 400 has the advantage of being able to work with short duration (e.g., less than a few msec such as 1 msec) and small amplitude (e.g., less than two diode drop) short beacons, which allow the PTU to save in power consumption. In some implementations, the capacitances C1 and C2 can be replaced with inductance elements and the reactive load L3 can be replaced by a capacitance element.

Figure 5:
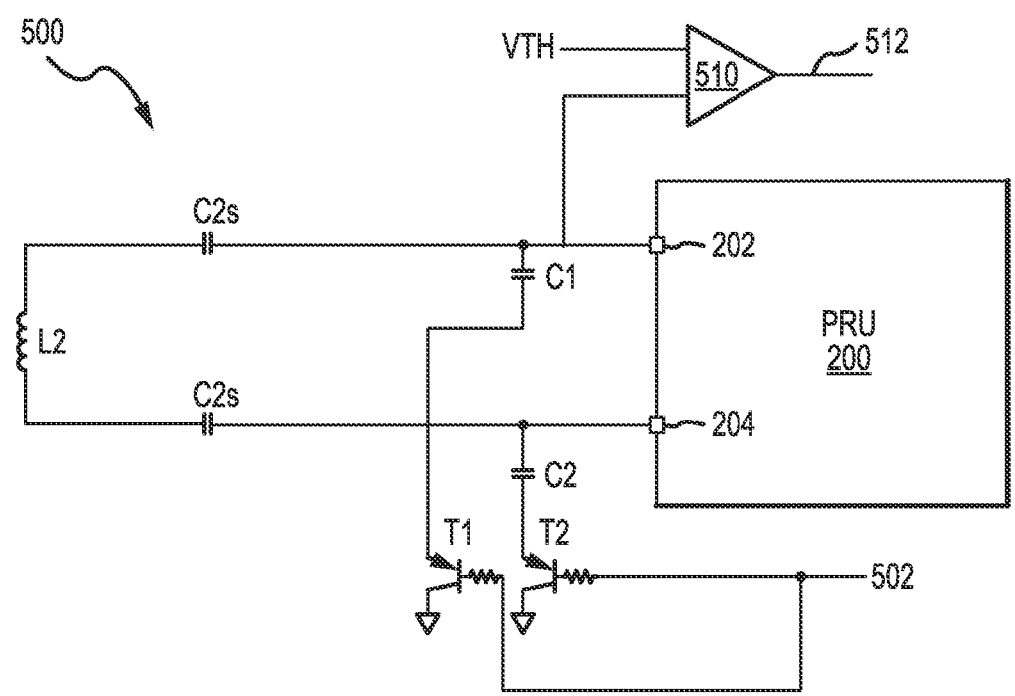
FIG. 5 illustrates an example of a device for detection of a PRU short beacon using a switched hybrid matching circuit employing external switches, in accordance with one or more implementations.

FIG. 5 illustrates an example of a device 500 for detection of a PRU during a short beacon using a switched hybrid matching circuit employing external switches, in accordance with one or more implementations. If the battery of an apparatus including the device 500 is charged enough for system operation, then load assertion can be done with the external switches. In some implementations, an active load level formed by capacitances C1 and C2 are switched by external bipolar junction transistors (BJTs) T1 and T2. The transistors T1 and T2 can be controlled by a signal 502 such as from a general purpose input output (GPIO) signal from the PRU 200 or from a processor. In one or more implementations, a comparator 510 can detect a small signal at the input node 202 of the PRU 200 by comparing the signal at the input node 202 with a small (e.g., 0.1V) threshold voltage (Vth), and in response to the detection, generate a signal 512 that causes a processor or a BLTE block to transmit an advertisement to the PTU. The PTU would need to look for a BTLE advertisement and then start the long beacon process in response to the received advertisement from the BTLE block. This solution is substantially low cost and can result in a significant PTU power consumption saving, as the PTU only starts energizing its coil when the PRU 200 is known for sure to be present. In one or more implementation, if the comparator 510 is powered by an external battery, the device 500 can be charged from a fully discharged state (e.g., dead battery) of the apparatus.

Figure 6:
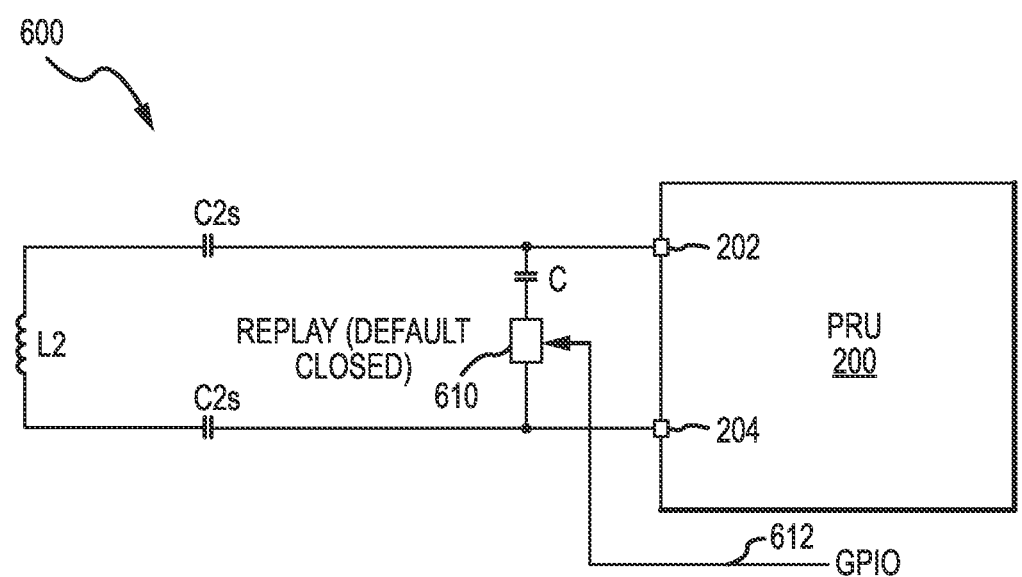
FIG. 6 illustrates an example of a device for detection of a PRU during a short beacon using a switched hybrid matching circuit employing an external relay, in accordance with one or more implementations.

FIG. 6 illustrates an example of a device 600 for detection of a PRU during a short beacon using a switched hybrid matching circuit employing an external relay 610, in accordance with one or more implementations of the subject technology. This solution adds a passive reactance that can load the PRU during short beacon signals, but at the time that the device 600 wakes up, the passive load can be switched out. Short beacon signals can have any amplitude. The relay switch 610 can be controlled by a GPIO signal 612 from the PRU 200 or from a processor. The relay 610 is closed at the start up and enables assertion of the capacitance C between nodes 202 and 204. Therefore, at the beginning of the short beacon, the change in reflected impedance can be detected by the PTU. The signal 612, upon waking up of the device 600, switches out the capacitance C1 by opening the relay switch.

Figure 7:
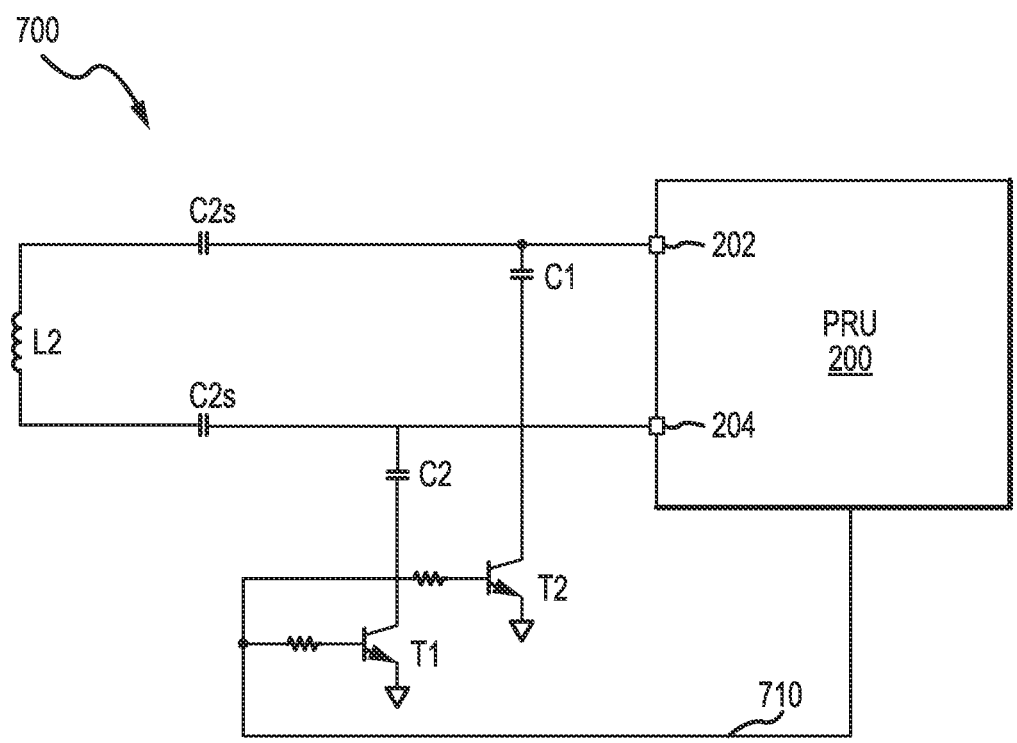
FIG. 7 illustrates another example of a device for detection of a PRU during a short beacon using a switched hybrid matching circuit employing external switches, in accordance with one or more implementations.

FIG. 7 illustrates an example of a device 700 for detection of a PRU during a short beacon using a switched hybrid matching circuit employing external switches, in accordance with one or more implementations. This solution adds a passive reactance that can load the PRU during short beacon signals but when the device 700 wakes up, the passive load can be switched out. Short beacon signals need enough amplitude (e.g., approximately 1V) to turn ON the external switches formed by BJTs (e.g., PNP transistors) to enable assertion of the impedance load (e.g., capacitances C1 and C2). The BJTs T1 and T1 are turned OFF by a GPIO terminal by default and can be turned ON by a signal 710 from the rectifier circuit of the PRU 200 in a short time (e.g., a few msec) after a start time of a short beacon.

FIG. 8 illustrates an example of a device 800 for detection of a PRU during a short beacon using a switched hybrid matching circuit employing external switches, in accordance with one or more implementations of the subject technology. The device 800 is similar to the device 700 and the switches S1 and S2 can be FET or BJT and similarly operate by the PRU 200 to enable assertion of the capacitance C1 and C2 in response to a short beacon with sufficient amplitude. The device 800 is further operable to transmit an advertisement (e.g., a BTLE signal) 810 simultaneously with assertion of the active load. The PTU monitors for and impedance change 820 that is occurring at the same time with receiving of an advertisement 810 to make sure that the PRU 200 is present in the PTU coverage area. The PTU can reject advertisements that are not accompanied by a load change (e.g., 820).

Referring back to system 100B of FIG. 1B, the PRU 150 is in close proximity to one or more coils (e.g., 102-1 and 102-2) of an array of coils of a PTU. The PRU 150 receives power from a selected coil of the array of coils, which is operable to generate the highest reflective impedance in a corresponding PTU and is energized by the corresponding PTU to charge the PRU 150. In one or more implementations, the PRU 150 may receive short beacons from a number of PTUs. In this case, during a connection process, the PRU 150 can select one of the PTUs based on strengths of signals received from the PTUs. Alternatively, the PRU 150 can request from each of the PTUs to send an indicator to the PRU 150 that indicates strength of a reflected impedance as detected by that PTU. The PRU 150 can then select one of the PTUs based on the indicators received from the PTUs to receive power from a PTU that detected the highest reflected impedance from the PRU 150.

Figure 9:
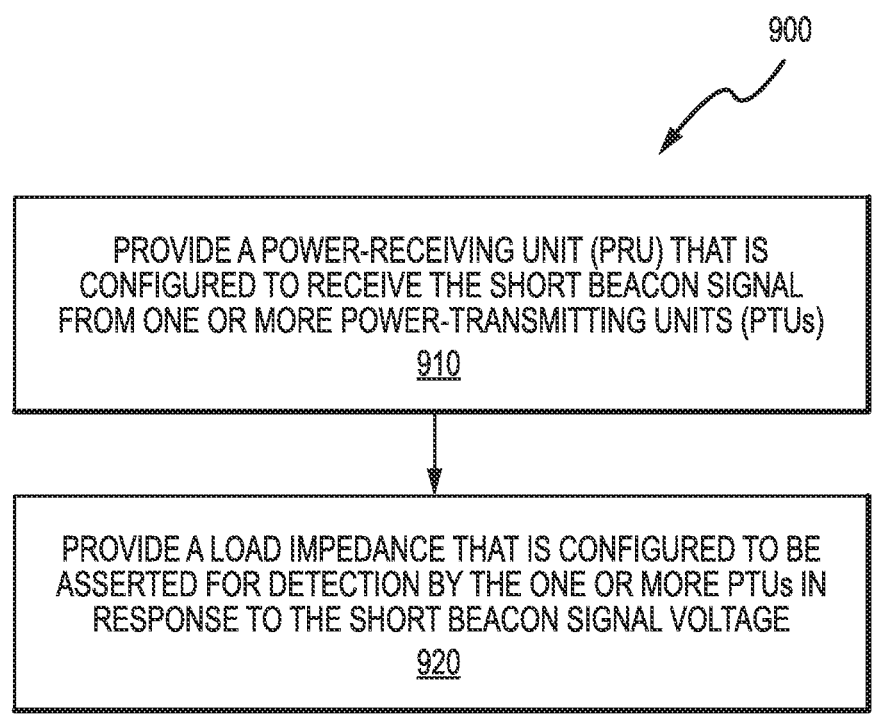
FIG. 9 illustrates an example of a method for detection of a PRU during a short beacon, in accordance with one or more implementations.

FIG. 9 illustrates an example of a method 900 for detection of a PRU short beacon, in accordance with one or more implementations of the subject technology. According to the method 900, a PRU (e.g., 200 of FIG. 2A) is provided that can receive the short beacon signal (e.g., 230 of FIG. 2C) from one or more PTUs (e.g., 100A of FIG. 1A) (910). An active load level (e.g., C1 and C2 of FIG. 2A) is provided that can be asserted for detection by the one or more PTUs in response to the PRU signaling during a short beacon (920). The active load level is configured to make, once asserted, a detectable change in a reflected impedance (e.g., 224 of FIG. 2C) of the PRU as measured by at least one of the one or more PTUs.

Figure 10:
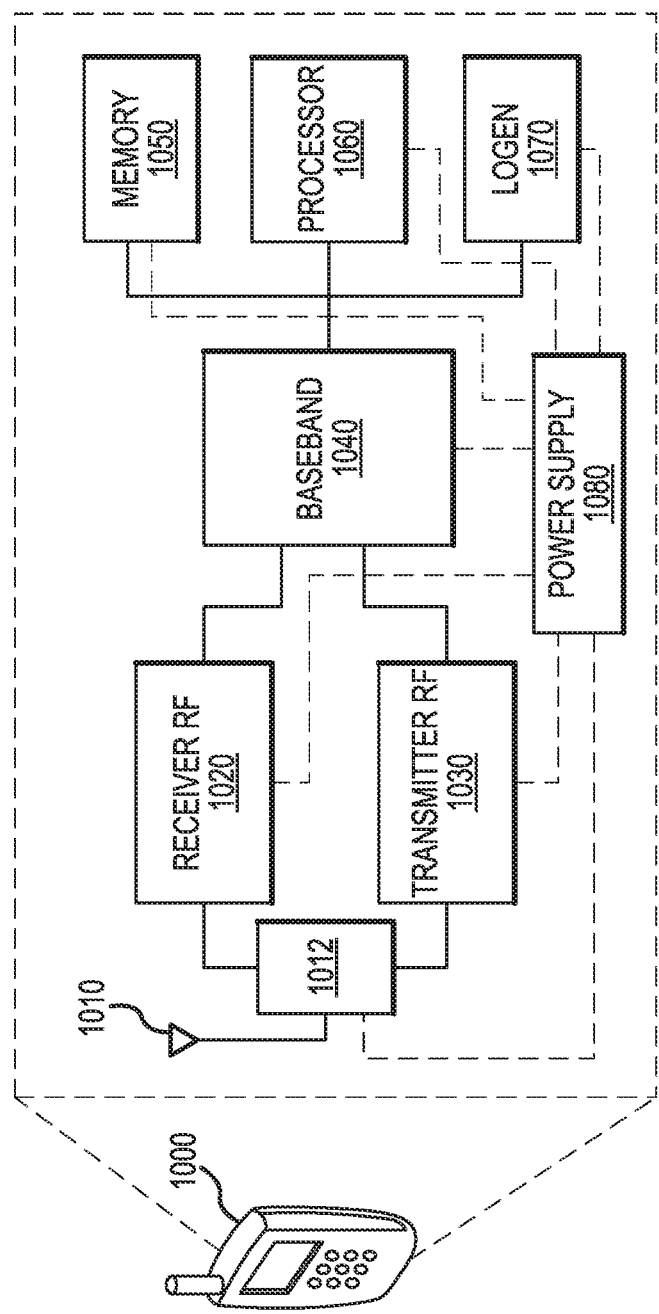
FIG. 10 illustrates an example of a wireless communication device employing features of the subject technology in accordance with one or more implementations.

FIG. 10 illustrates an example of a wireless communication device 1000 employing features of the subject technology in accordance with one or more implementations of the subject technology. The wireless communication device 1000 includes a radio-frequency (RF) antenna 1010, a receiver 1020, a transmitter 1030, a baseband processing module 1040, a memory 1050, a processor 1060, a local oscillator generator (LOGEN) 1070, and a power supply 1080. In various embodiments of the subject technology, one or more of the blocks represented in FIG. 10 can be integrated on one or more semiconductor substrates. For example, the blocks 1020-1070 can be realized in a single chip or a single system on chip, or can be realized in a multi-chip chipset.

The RF antenna 1010 can be suitable for transmitting and/or receiving RF signals (e.g., wireless signals) over a wide range of frequencies. Although a single RF antenna 1010 is illustrated, the subject technology is not so limited.

The receiver 1020 comprises suitable logic circuitry and/or code that can be operable to receive and process signals from the RF antenna 1010. The receiver 1020 may, for example, be operable to amplify and/or down-convert received wireless signals. In various embodiments of the subject technology, the receiver 1020 is operable to cancel noise in received signals and can be linear over a wide range of frequencies. In this manner, the receiver 1020 is suitable for receiving signals in accordance with a variety of wireless standards. Wi-Fi. WiMAX, Bluetooth, and various cellular standards.

The transmitter 1030 comprises suitable logic circuitry and/or code that can be operable to process and transmit signals from the RF antenna 1010. The transmitter 1030 may, for example, be operable to up-convert baseband signals to RF signals and amplify RF signals. In various embodiments of the subject technology, the transmitter 1030 is operable to up-convert and to amplify baseband signals processed in accordance with a variety of wireless standards. Examples of such standards include Wi-Fi, WiMAX, Bluetooth, and various cellular standards. In various embodiments of the subject technology, the transmitter 1030 is operable to provide signals for further amplification by one or more power amplifiers.

The duplexer 1012 provides isolation in the transmit band to avoid saturation of the receiver 1020 or damaging parts of the receiver 1020, and to relax one or more design requirements of the receiver 1020. Furthermore, the duplexer 1012 can attenuate the noise in the receive band. The duplexer is operable in multiple frequency bands of various wireless standards.

The baseband processing module 1040 comprises suitable logic, circuitry, interfaces, and/or code that can be operable to perform processing of baseband signals. The baseband processing module 1040 may, for example, analyze received signals and generate control and/or feedback signals for configuring various components of the wireless communication device 1000 such as the receiver 1020. The baseband processing module 1040 is operable to encode, decode, transcode, modulate, demodulate, encrypt, decrypt, scramble, descramble, and/or otherwise process data in accordance with one or more wireless standards.

The processor 1060 comprises suitable logic, circuitry, and/or code that can enable processing data and/or controlling operations of the wireless communication device 1000. In this regard, the processor 1060 is enabled to provide control signals to various other portions of the wireless communication device 1000. The processor 1060 can also control transfers of data between various portions of the wireless communication device 1000. Additionally, the processor 1060 can enable implementation of an operating system or otherwise execute code to manage operations of the wireless communication device 1000.

The memory 1050 comprises suitable logic, circuitry, and/or code that can enable storage of various types of information such as received data, generated data, code, and/or configuration information. The memory 1050 includes, for example, RAM, ROM, flash, and/or magnetic storage. In various embodiment of the subject technology, the memory 1050 may include a RAM, DRAM, SRAM, T-RAM, Z-RAM, TTRAM, or any other storage media.

The local oscillator generator (LOGEN) 1070 comprises suitable logic, circuitry, interfaces, and/or code that can be operable to generate one or more oscillating signals of one or more frequencies. The LOGEN 1070 can be operable to generate digital and/or analog signals. In this manner, the LOGEN 1070 can be operable to generate one or more clock signals and/or sinusoidal signals. Characteristics of the oscillating signals such as the frequency and duty cycle can be determined based on one or more control signals from, for example, the processor 1060 and/or the baseband processing module 1040.

In operation, the processor 1060 can configure the various components of the wireless communication device 1000 based on a wireless standard according to which it is desired to receive signals. Wireless signals can be received via the RF antenna 1010 and amplified and down-converted by the receiver 1020. The baseband processing module 1040 can perform noise estimation and/or noise cancellation, decoding, and/or demodulation of the baseband signals. In this manner, information in the received signal can be recovered and utilized appropriately. For example, the information can be audio and/or video to be presented to a user of the wireless communication device, data to be stored to the memory 1050, and/or information affecting and/or enabling operation of the wireless communication device 1000. The baseband processing module 1040 can modulate, encode and perform other processing on audio, video, and/or control signals to be transmitted by the transmitter 1030 in accordance to various wireless standards.

In some implementations of the subject technology, the wireless communication device 1000 may include any of the devices of the subject technology (e.g., 200A of FIG. 2A) to receive electrical power wirelessly from a PTU (e.g., 100A of FIG. 1A) as explained above.

Those of skill in the art would appreciate that the various illustrative blocks, modules, elements, components, and methods described herein can be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect can apply to all configurations, or one or more configurations. An aspect can provide one or more examples of the disclosure. A phrase such as an "aspect" refers to one or more aspects and vice versa. A phrase such as an "embodiment" does not imply that such embodiment is essential to the subject technology or that such embodiment applies to all configurations of the subject technology. A disclosure relating to an embodiment can apply to all embodiments, or one or more embodiments. An embodiment can provide one or more examples of the disclosure. A phrase such an "embodiment" can refer to one or more embodiments and vice versa. A phrase such as a "configuration" does not imply that such configuration is essential to the subject technology or that such configuration applies to all configurations of the subject technology. A disclosure relating to a configuration can apply to all configurations, or one or more configurations. A configuration can provide one or more examples of the disclosure. A phrase such as a "configuration" can refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device for detecting a short beacon signal, the device comprising:
    a power-receiving unit (PRU) configured to receive the short beacon signal from one or more power-transmitting units (PTUs); and
    a switch operable to assert an active load level for detection by the one or more PTUs in response to the short beacon signal,
    wherein the active load level, once asserted, makes a detectable change in a reflected impedance associated with of the PRU that is measurable by at least one of the one or more PTUs, and wherein the switch is configured to be turned ON by a first signal receivable from a rectifier circuit of the PRU.

2. The device of claim 1, wherein the PRU comprises a semiconductor chip including input ports to couple a PRU coil and output ports to couple to a charging circuitry.

3. The device of claim 2, wherein an active load comprises two first passive reactance elements, and wherein each of the two first passive reactance elements is coupled between a port of the input ports of the PRU and the switch is configured to be operable to couple a respective one of the two first passive reactance elements to ground potential.

4. The device of claim 3, wherein:
    the two first passive reactance elements comprise capacitors,
    the switch comprises a filed effect transistor (FET) implemented in the semiconductor chip,
    the FET is configured to be turned OFF in response to a second signal,
    the second signal is provided by software, wherein assertion of the active load level is simultaneous with transmission of a radio-frequency (RF) signal indicating presence of the PRU, and
    the RF signal comprises a Bluetooth low power (BTLE) signal.

5. The device of claim 3, further comprising a second passive reactance element coupled to the input ports of the PRU, wherein the second passive reactance element comprises an inductor, and wherein the two first passive reactance elements comprise two capacitors, and wherein the switch is operable to couple a respective capacitor of the two capacitors to ground potential in response to a delayed signal, wherein the delayed signal is delayed with respect to a start time of the short beacon, and wherein the delayed signal is provided by software.

6. The device of claim 3, further comprising a second passive reactance element coupled to the input ports of the PRU, wherein the second passive reactance element comprises a capacitor, and wherein the two first passive reactance elements comprise two inductors, and wherein the switch is operable to couple a respective inductor of the two inductors to ground potential in response to a delayed signal, wherein the delayed signal is delayed with respect to a start time of the short beacon, and wherein the delayed signal is provided by software.

7. The device of claim 3, wherein the switch is implemented by an off-chip bipolar junction transistor (BJT), wherein a short beacon amplitude is sufficiently large to turn ON the BJT, wherein the BJT is configured to be turned OFF by a delayed signal, wherein the delayed signal is controlled by software.

8. The device of claim 3, wherein the switch is implemented by an off-chip bipolar junction transistor (BJT), wherein the PRU has enough power left to operate BJTs, wherein the device further comprise a comparator configured to compare a voltage on one of the input ports of the PRU with a threshold voltage, and in response to determining that the voltage is larger than the threshold voltage, to trigger transmission of a Bluetooth low power (BTLE) signal to the one or more PTUs to cause at least one of the one or more PTUs to transmit a long beacon.

9. The device of claim 1, wherein the active load level is coupled in series with a relay, wherein the relay is configured to switch out the active load level when the PRU wakes up, wherein an amplitude of the short beacon is not limiting an operation of the device.

10. The device of claim 1, wherein,
the PRU is configured to select, during a connection process, one of the one or more PTUs based on strengths of signals received from the one or more PTUs,
the PRU is configured to request from each of the one or more PTUs to send an indicator to the PRU indicating a strength of a reflected impedance as detected by that PTU, and
the PRU is configured to select one of the one or more PTUs based on the indicators received from the one or more PTUs to receive power from a PTU of the one or more PTUs that detected a highest reflected impedance from the PRU.

11. The device of claim 1, wherein PRU is in close proximity to one or more coils of an array of coils of a PTU of the one or more PTUs,
the PRU is configured to receive power from a selected coil of the array of coils,
the selected coil comprises one of the coils of the array of coils that is operable to generate a highest reflective impedance in the PTU of the one or more PTUs and is energized by the PTU of the one or more PTUs to charge the PRU.

12. A method of providing a device for detecting a short beacon signal, the method comprising:
providing a power-receiving unit (PRU) that is configured to receive the short beacon signal from one or more power-transmitting units (PTUs); and
providing a switch operable to assert an active load level for detection by the one or more PTUs in response to the short beacon signal,
wherein the active load level is configured to cause, once asserted, a detectable change in a reflected impedance of the PRU that is measurable by at least one of the one or more PTUs, and wherein the switch is configured to be turned ON by a first signal receivable from a rectifier circuit of the PRU.

13. The method of claim 12, wherein the PRU comprises a semiconductor chip including input ports to couple a PRU coil and output ports to couple to a charging circuitry, wherein an active load comprises two first passive reactance elements and each of the two first passive reactance elements is coupled between a port of the input ports of the PRU and the switch, wherein the switch is configured to be operable to couple a respective one of the two first passive reactance elements to ground potential.

14. The method of claim 13, wherein:
the two first passive reactance elements comprise two capacitors,
providing the switch comprises providing a filed effect transistor (FET) implemented in the semiconductor chip,
the assertion of the active load level is simultaneous with transmission of a radio-frequency (RF) signal indicating presence of the PRU,
the RF signal comprises a Bluetooth low power (BTLE) signal, and
the method further comprises:
configuring the FET to be turned OFF in response to a second signal, and
providing the second signal via software.

15. The method of claim 13, further comprising providing a second passive reactance element coupled to the input ports of the PRU, wherein providing the second passive reactance element comprises providing an inductor, and wherein the two first passive reactance elements comprise two capacitors, and wherein the switch is operable to couple a respective capacitor of the two capacitors to ground potential in response to a delayed signal, wherein the delayed signal is delayed with respect to a start time of the short beacon, and wherein the delayed signal is provided by software.

16. The method of claim 13, further comprising providing a second passive reactance element coupled to the input ports of the PRU, wherein providing the second passive reactance element comprises providing a capacitor, and wherein the two first passive reactance elements comprise two inductors, and wherein the switch is operable to couple a respective inductor of the two inductors to ground potential in response to a delayed signal, wherein the delayed signal is delayed with respect to a start time of the short beacon, and wherein the delayed signal is provided by software.

17. The method of claim 13, further comprising providing the switch comprises providing an off-chip bipolar junction transistor (BJT), wherein a short beacon amplitude is sufficiently large to turn ON the BJT, wherein the BJT is configured to be turned OFF by a delayed signal, wherein the delayed signal is controlled by software.

18. The method of claim 13, wherein providing the switch comprises providing an off-chip bipolar junction transistor (BJT), wherein the PRU has enough power left to operate BJTs, wherein the method further comprise providing a comparator configured to compare a voltage on one of the input ports of the PRU with a threshold voltage, and in response to determining that the voltage is larger than the threshold voltage to trigger transmission of a Bluetooth low power (BTLE) signal to the one or more PTUs to cause at least one of the one or more PTUs to transmit a long beacon.

19. The method of claim 12, wherein the method further comprises configuring the PRU to:
- select, during a connection process, one of the one or more PTUs based on strengths of signals received from the one or more PTUs,
- request from each of the one or more PTUs to send an indicator to the PRU indicating a strength of a reflected impedance as detected by that PTU,
- select one of the one or more PTUs based on the indicators received from the one or more PTUs to receive power from a PTU of the one or more PTUs that detected a highest reflected impedance from the PRU, and
- receive power from a selected coil of the array of coils of a PTU of the one or more PTUs,
- wherein PRU is in close proximity to one or more coils of the array of coils, and
- the selected coil comprises one of the coils of the array of coils that is operable to generate a highest reflective impedance in the PTU of the one or more PTUs and is energized by the PTU of the one or more PTUs to charge the PRU.

20. A system comprising:
- a power-transmitting unit (PTU) coupled to one or more transmit (TX) coils;
- a power receiving unit (PRU) configured to receive power via magnetic coupling to at least one of the one or more transmit (TX) coils; and
- a switch operable to assert an active load level in response to a short beacon signal received from the PTU,
- wherein the PTU is configured to detect a change in a reflected impedance associated with the PRU in response to the assertion of the active load level, and
- wherein the switch is configured to be turned ON by a first signal receivable from a rectifier circuit of the PRU.

* * * * *